Dec. 20, 1966  C. G. JINES  3,292,684
ROLL UP PROTECTIVE COVERING FOR VEHICLE
TOPS INCLUDING THE WINDOWS

Filed Dec. 23, 1964  2 Sheets-Sheet 1

CHESTER G. JINES
INVENTOR.

BY James D. Givman
ATT'Y

Dec. 20, 1966   C. G. JINES   3,292,684
ROLL UP PROTECTIVE COVERING FOR VEHICLE
TOPS INCLUDING THE WINDOWS
Filed Dec. 23, 1964   2 Sheets-Sheet 2
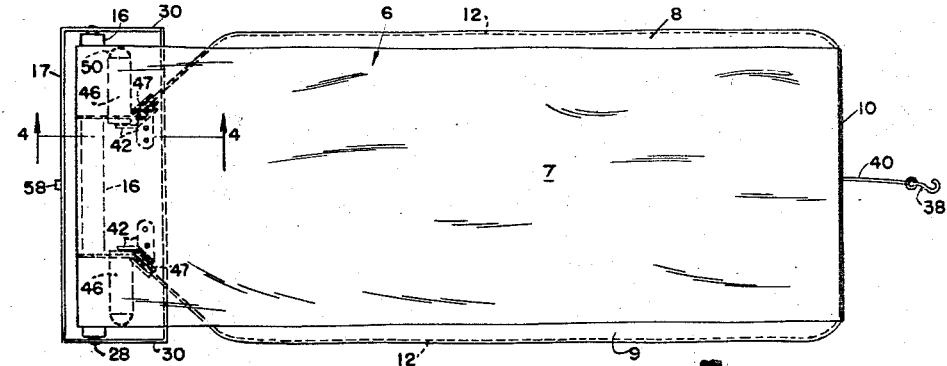
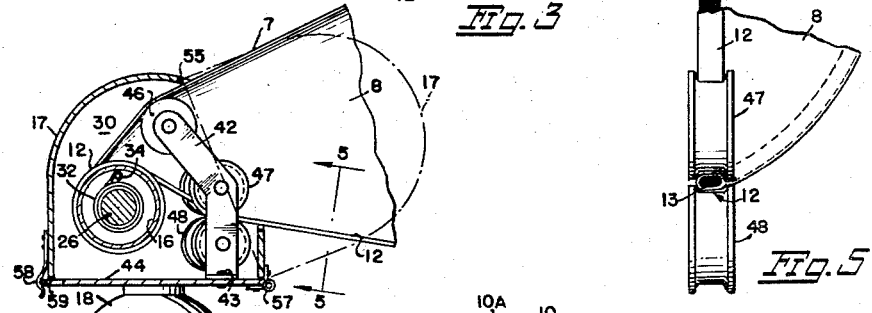
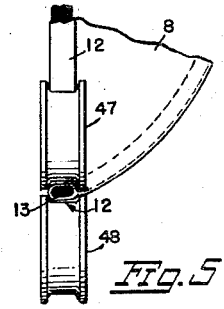
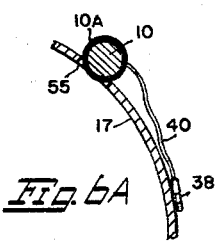
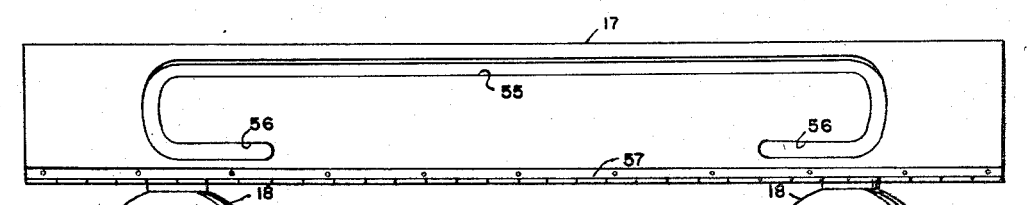
CHESTER G. JINES
*INVENTOR.*
BY *James D. Girman*
ATT'Y ////United States Patent Office 3,292,684
Patented Dec. 20, 1966

3,292,684
ROLL UP PROTECTIVE COVERING FOR VEHICLE TOPS INCLUDING THE WINDOWS
Chester G. Jines, P.O. Box 26, Forest Grove, Oreg. 91116
Filed Dec. 23, 1964, Ser. No. 420,671
2 Claims. (Cl. 160—23)

This invention relates to protective means for the tops of vehicles whereby the windshield and side and rear windows thereof may be temporarily covered and protected against frost, rain, snow, salt air at seashore parking and other corrosive or deteriorating weathering agents of atmospheric conditions; second, to provide apparatus of the character described whereby portions of the vehicle to be protected may be easily and quickly covered by one person with little effort; third, to provide apparatus which may be carried either as a permanent fixture or an accessory on the vehicle so that said covering means is instantly available; fourth, to provide a covering which, when not in use, is stored compactly within a housing attached to the vehicle at any desired location and which housing is of such dimensions that it does not detract from the streamlined or other graceful and pleasing overall appearance of the modern automobile; fifth to provide a covering which is conveniently adaptable to automotive or trailer campers for use as a canopy or awning over a doorway of a camper or outwardly from either side of the camper body as a protection against rays of sunlight, rain and the like. The same applies to its adaptability to an open boat for quickly covering and protecting the contents thereof, such as perishable foodstuffs, clothing and other articles against water damage from sudden rain squalls and the like. In the two last named uses the covering material should be of a nontransparent or similar opaque material, and artistically colored if desired, instead of clear plastic above referred to; and finally, to provide apparatus for the purpose intended which is of simple, efficient, durable and inexpensive construction, which may be quickly and conveniently mounted for the uses above pointed out without the use of hand tools, screw fasteners or the like.

The foregoing and other objects and advantages which will become subsequently apparent reside in the details of construction and operation as more fully hereinafter described and claimed, reference being had to the accompanying drawings forming a part hereof and in which:

FIGURE 3 is a top plan view of the protective covering extended outwardly from its housing.

FIGURE 4 is a sectional end elevational view on an enlarged scale taken approximately along the line 4—4 of FIGURE 3.

FIGURE 5 is a similar view taken along the line 5—5 of FIGURE 4.

FIGURE 6 is a front elevational view on an enlarged scale of the housing for the protective covering and its functionally related parts.

FIGURE 6A is a fragmentary sectional detail view of a rubber covered pull rod at the free end of the covering for also closing an elongated opening in the housing when the protective cover is fully retracted.

Figure 1:
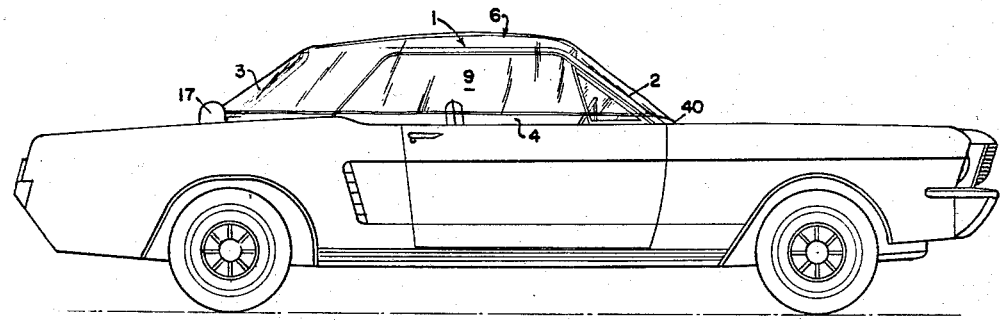
FIGURE 1 is a side elevational view of a passenger automobile showing protective covering and apparatus made in accordance with my invention operatively attached to the vehicle body.
Figure 2:
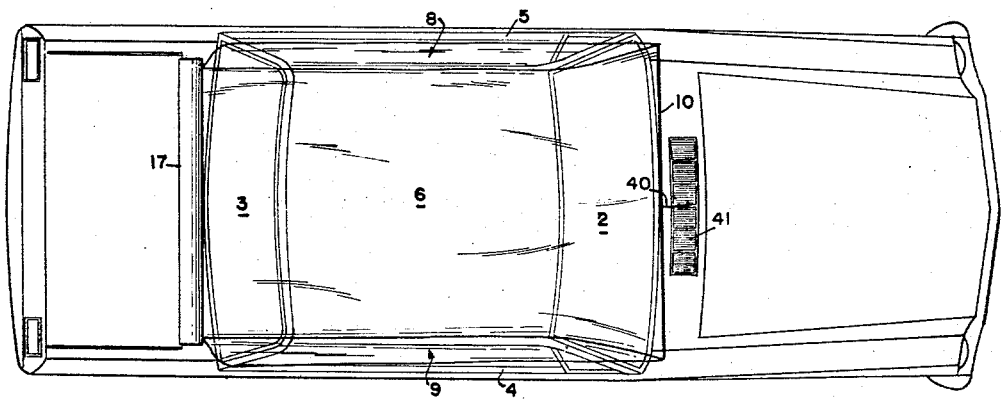
FIGURE 2 is a top plan view of FIGURE 1.

With continuing reference to the drawings wherein like reference characters designate like parts and particularly FIGURES 1 and 2 thereof wherein a conventional passenger vehicle is illustrated, reference numeral 1 indicates the top, 2 the windshield, 3 the rear window, and 4 and 5 the side windows of the vehicle body.

The protective covering made in accordance with my invention and also illustrated in FIGURE 3 comprises an elongated flexible sheet, preferably though not restrictively of clear plastic, synthetic rubber or resin material, fabric or impregnated fabric or any other suitable waterproof or water-repellent material 6 and comprising a main center section 7, side flaps or marginal portions 8 and 9 and provided at its free end with a stiffening rod 10 to insure a lateral spread of the central section at all times.

The bottom edges of the side flaps 8 are provided with a beading 12 which, as best illustrated in FIGURE 5, comprises a strip of live rubber 13 extending throughout the length of the flaps and secured thereto by any suitable means.

The opposite end of the covering, as best illustrated in FIGURE 4, is permanently secured in any suitable manner to a wind-up roller 16 rotatably mounted within a housing 17 which is provided with suction cups 18 and thereby adapted for removable selective securement to the body of a vehicle at any desired location, such for instance, as the rear portion thereof adjacent the bottom of the rear window, as shown in FIGURES 1 and 2.

It is to be understood that I do not wish to be limited to suction cups as the attaching means since they form no part of the present invention and are merely exemplary of any means for attaching the housing to the vehicle either at the rearward portion as shown, or on the hood or forward cowling if desired.

Figure 7:
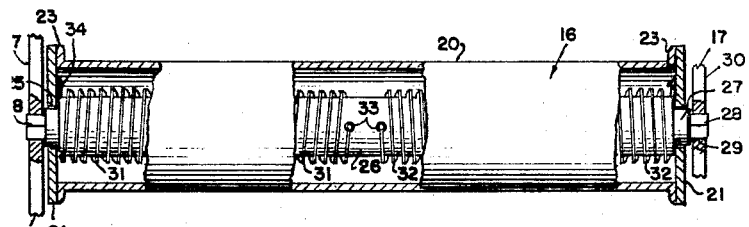
FIGURE 7 is a fragmentary detail view on a further enlarged scale of a wind-up roller.
Figure 8:
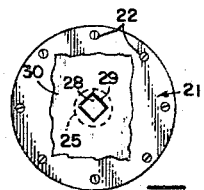
FIGURE 8 is an end elevational view of FIGURE 7.

The wind-up roller 16, as best illustrated in FIGURE 7, comprises an elongated hollow cylinder 20 closed at both of its ends by caps or end pieces 21 removably secured as at 22 to the flanged ends 23 of the cylinder. The caps 21 are each provided with a concentric central opening 25 which render the cylinder rotatable about a round core 26 by means of the reduced ends 27, the terminal ends of which are of square section as at 28 for fixed non-rotatable engagement with squared openings 29 in the end walls 30 of the housing 17. Thus it will be seen that the roller 16 is rotatable clockwise and counterclockwise about the fixedly mounted core 26. The roller 16 is operable in a manner similar to that of the well-known window shade wherein an outward or downward pull on a curtain will energize a coil spring which, when the curtain is released, will rewind the curtain by the stored energy of the spring. In such curtain rollers, however, only a single spring is used and is attached at one of its ends to the roller and at its opposite end to the spring-supporting core and wherein the wind-up tension of the spring is gradually accumulated from one end to the other and the release of the stored energy is reversed throughout the length of the spring. In contrast to this, I provide two cooperating coil springs 31–32 secured at their inner ends as at 33 to the core 26 and at their opposite ends as at 34 to the caps 21 so that as the roller 16 is rotated in a counterclockwise direction, as viewed in FIGURE 8, by an outward pull on the covering 6 both springs will be fully wound about the fixedly mounted core when the covering reaches its fully extended position shown in FIGURES 1 and 3. For holding the covering when so extended, I provide a hook 38, or other suitable fastener, at the end of a flexible cord or cable 40 secured to the center of the stiffening rod 10. The hook is adapted for attachment to any fixture or accessory within reach of the cord 40, such for instance as the grille 41 on the cowl of the car body, or to some rear end point of attachment if the spread of the covering is reversed.

As best illustrated in FIGURES 3–5, a pair of brackets 42, which are identical except for their right and left hand disposition, are secured as at 43 to the bottom wall 44 of the housing 17 and extend upwardly and rearwardly as shown. Each bracket rotatably supports at its top end what might be termed a folding roller 46, parallel with the wind-up roller 16, and therebelow a pair of cooperating matching grooved rollers 47–48 disposed diagonally relative to the inner ends of said folding rollers 46. Thus the beading 12 of the flaps is confined to passage between the grooved rollers 47–48 throughout the length of the covering when being paid out from the housing or retracted thereinto. When the covering is released from its extended hooked position, as shown in FIGURE 3, the wind-up roller 16 will be put into operation by the energized springs 31–32 as aforesaid and such rotation of the roller will, of course, retract the covering as it is wound about the roller in the manner, as best illustrated in FIGURES 3 and 4, wherein it will be seen that the inner end portion of the center section 7 will be drawn about the rounded ends 50 of the rollers 46 while the side flaps 8 and 9 are turned under and fed onto the wind-up roller 16 by their running engagement of the beading 12 with the diagnolly disposed grooved rollers 47–48, preparatory to complete folding and winding about the wind-up roller.

As best illustrated in FIGURE 6, the front of the housing is provided with an elongated slot 55 curved downwardly and inwardly as at 56 at both of its ends to serve as a guide for the incoming central portion 7 of the covering and the downwardly and inwardly turned side flaps 8 and 9 through the downwardly and inwardly curved portions 56.

The pull rod 10, also serving as a limit-stop for the wind-up, is rubber covered as at 10A, as shown in FIGURE 6A, to provide a seal for the slot 55 in the housing 17 when the covering is fully retracted. This resilient covering also prevents damage or distortion to the wall of the housing or the edges of the slot by cushioning the impact of the pull rod in the event that the wind-up operation of the covering is not manually controlled.

In the event that it should become desirable or necessary to render the interior of the housing 17 accessible for cleaning or replacement of parts, or the lubrication thereof, I hingedly attach the front wall of the housing to its supporting wall 44, preferably though not restrictively, by a piano hinge 57 and provide its rearward bottom edge with any suitable type of latch 58 cooperable with the detent or keeper 59 secured to the corresponding edge of the bottom wall 44.

As indicated by broken lines in FIGURE 4, the housing may be swung open about the hinge 57 with little or no resistance from the covering 6 whether the opposite end thereof is hooked or free since such movement of the housing toward that end would slacken the covering between both of its ends.

While I have shown a particular form of embodiment of my invention, I am aware that many minor changes therein will readily suggest themselves to others skilled in the art without departing from the spirit and scope of the invention.

Having thus described my invention, what I claim as new and desire to protect by Letters Patent is:

1. Protective covering apparatus for vehicle bodies having a windshield, rear and side windows,
   an elongated hollow housing having front, rear and end walls and an elongated opening in one of said walls,
   means removably securing said housing transversely to the vehicle body adjacent the rear window thereof,
   a self-winding roller energized by rotation in one direction,
   means rotatably mounting the roller within said housing,
   a pair of horizontally disposed rollers spaced apart in the direction of the length of said winding roller,
   two pairs of cooperating diagonally disposed rollers within the housing spaced inwardly from the ends thereof and disposed diagonally relative to the spaced apart ends of said pair of horizontally disposed rollers,
   an elongated sheet of flexible material having side marginal portions extending downwardly through the length thereof and secured at one of its ends to said self-winding roller,
   a beading extending substantially throughout the length of the bottom edge of each of said side marginal portions,
   said sheet material guided in retraction by said horizontal rollers onto said winding roller when in rotation in an opposite direction,
   the beading of said marginal portions of the sheet material confined to passage through said pairs of diagonally disposed cooperating rollers onto said wind-up roller along with said sheet material in an inwardly folded condition about said wind-up roller.

2. A shelter-forming protective covering for vehicles comprising in combination,
   an elongated sheet of flexible material having side marginal portions extendable downwardly to provide side flaps,
   means secured to the free end of said covering removably securing the same to a point of attachment on a vehicle body adjacent one transversely disposed window thereof,
   a hollow housing,
   means mounting said housing to the top side of a vehicle body transversely of said covering and adjacent another transversely disposed window,
   a hollow wind-up roller rotatably mounted within said housing,
   means attaching the opposite end of the covering to said roller,
   a stationary core disposed within said roller extending outwardly from both ends thereof and secured against rotation by said housing,
   at least one coil spring coiled about said core with one of its ends secured to the core and its opposite end secured to the roller whereby rotation of the roller in one direction will energize the spring to impart rotation to the roller in an opposite direction,
   the bottom edges of said side flaps having a beading therealong substantially throughout the length thereof,
   two pairs of cooperating grooved rollers within the housing and spaced inwardly from the ends thereof, and
   the beading of said flaps confined to passage through said pairs of grooved rollers onto said wind-up roller along with said sheet in an inwardly folded condition about said wind-up roller.

References Cited by the Examiner

UNITED STATES PATENTS

| | | | |
|---|---|---|---|
| 1,719,055 | 7/1929 | Herzer | 160—23 X |
| 2,756,438 | 7/1956 | Soberman | 160—23 X |
| 2,773,547 | 12/1956 | Voss | 160—23 X |
| 3,017,927 | 1/1962 | Demko | 160—271 |

HARRISON R. MOSELEY, Primary Examiner.

J. K. BELL, Assistant Examiner.